US010570826B2

(12) United States Patent
Ryon et al.

(10) Patent No.: US 10,570,826 B2
(45) Date of Patent: Feb. 25, 2020

(54) FUEL MANIFOLD WITH NESTED ANNULAR PASSAGES AND RADIALLY EXTENDING CHANNELS

(71) Applicant: Delavan Inc., West Des Moines, IA (US)

(72) Inventors: Jason A. Ryon, Carlisle, IA (US); Jacob Greenfield, Granger, IA (US); Lev Alexander Prociw, Johnston, IA (US)

(73) Assignee: Delavan Inc., West Des Moines, IA (US)

(*) Notice: Subject to any disclaimer, the term of this patent is extended or adjusted under 35 U.S.C. 154(b) by 187 days.

(21) Appl. No.: 15/714,265

(22) Filed: Sep. 25, 2017

(65) Prior Publication Data

US 2019/0093560 A1    Mar. 28, 2019

(51) Int. Cl.
*F02C 7/22* (2006.01)
*F23R 3/36* (2006.01)
*F23R 3/34* (2006.01)

(52) U.S. Cl.
CPC .............. *F02C 7/222* (2013.01); *F23R 3/346* (2013.01); *F23R 3/36* (2013.01); *F05D 2220/32* (2013.01); *F05D 2240/35* (2013.01); *F23R 2900/00012* (2013.01)

(58) Field of Classification Search
CPC .. F02C 7/22; F02C 7/222; F02C 7/228; F23R 3/36; F23R 3/346; F23R 3/34; F23R 3/28
See application file for complete search history.

(56) References Cited

U.S. PATENT DOCUMENTS

| 5,713,206 A | * | 2/1998 | McWhirter | F23D 14/02 60/737 |
| 6,092,363 A | * | 7/2000 | Ryan | F02C 3/20 60/39.463 |
| 6,148,604 A | * | 11/2000 | Salt | F01D 9/023 60/39.37 |

(Continued)

FOREIGN PATENT DOCUMENTS

| EP | 1736651 A2 | 12/2006 |
| EP | 3348813 A1 | 7/2018 |
| WO | 2014/133406 A1 | 9/2014 |

OTHER PUBLICATIONS

U.S. Appl. No. 15/407,972, filed Jan. 17, 2017.

(Continued)

*Primary Examiner* — Scott J Walthour
*Assistant Examiner* — Todd N Jordan
(74) *Attorney, Agent, or Firm* — Locke Lord LLP; Scott D. Wofsy; Joshua L. Jones

(57) ABSTRACT

A fluid manifold includes a manifold body, a first annular passage and a second annular passage. The first annular passage is defined within the manifold body between a first passage inlet and a first passage outlet downstream from the first passage inlet. The second annular passage is defined within the manifold body nested radially outward from the first annular passage, and between a second passage inlet and a second passage outlet downstream from the second passage inlet. The first and second annular passages are concentric about a manifold axis. The first passage outlet and the second passage outlet are positioned at the same axial position relative to the manifold axis.

20 Claims, 5 Drawing Sheets

(56) References Cited

U.S. PATENT DOCUMENTS 7,134,287 B2 * 11/2006 Belsom ............... F23R 3/60
                                                        60/800
8,205,452 B2 *  6/2012 Boardman ........... F23R 3/12
                                                        60/737

OTHER PUBLICATIONS

U.S. Appl. No. 15/382,044, filed Dec. 16, 2016.
U.S. Appl. No. 15/381,609, filed Dec. 16, 2016.
U.S. Appl. No. 15/382,112, filed Dec. 16, 2016.
Extended European Search Report dated Jan. 18, 2019, issued during the prosecution of European Patent Application No. EP 18196247 (8 pages).

* cited by examiner

FUEL MANIFOLD WITH NESTED ANNULAR PASSAGES AND RADIALLY EXTENDING CHANNELS

BACKGROUND OF THE INVENTION

1. Field of the Invention

The present disclosure relates to fluid manifolds, and more particularly to manifolds such as used in gas turbine engines.

2. Description of Related Art

In gas turbine engines, such as industrial gas turbine engines used for power production, there is often a need to utilize more than one type of fuel. Fuel manifolds can route multiple different types of fuel to suitable injectors within the gas turbine engine. Traditional fuel manifolds are relatively complicated and bulky, especially when multiple fuels must be routed to the engine while remaining in fluid isolation from one another en route. The complicated nature of fuel manifolds is compounded if it is desired to utilize staged fuel injection, e.g., for improved turn down ratios.

The conventional techniques have been considered satisfactory for their intended purpose. However, there is an ever present need for improved fluid manifolds. This disclosure provides a solution for this.

SUMMARY OF THE INVENTION

A fluid manifold includes a manifold body, a first annular passage and a second annular passage. The first annular passage is defined within the manifold body between a first passage inlet and a first passage outlet downstream from the first passage inlet. The second annular passage is defined within the manifold body nested radially outward from the first annular passage, and between a second passage inlet and a second passage outlet downstream from the second passage inlet. The first and second annular passages are concentric about a manifold axis. The first passage outlet and the second passage outlet are positioned at the same axial position relative to the manifold axis.

In accordance with some embodiments, the first passage outlet and the second passage outlet are circumferentially offset from one another relative to the manifold axis. The fluid manifold can include at least one additional annular passage defined within the manifold body. A first one of the at least one additional annular passage can be nested radially outward of the second annular passage. The manifold body can include a cylindrical dividing portion. The first annular passage and the second annular passage can be fluidically isolated from another by the cylindrical dividing portion.

It is contemplated that the first passage outlet can be one of a plurality of distinct first passage outlets. Each of the first passage outlets can be in fluid communication with the first annular passage through a respective outlet channel branching off from the first annular passage. Each of the outlet channels can extend in a radial direction relative to the manifold axis.

The second passage outlet can be one of a plurality of distinct second passage outlets. Each of the second passage outlets can be in fluid communication with the second annular passage through a respective outlet channel branching off from the second annular passage. Each of the outlet channels can extend in a radial direction relative to the manifold axis.

The inlets of the first and second annular passages can be formed in an upstream axial facing surface of the manifold body. The manifold body can define a seal groove on an outer surface of the manifold body. The seal groove can include an upstream facing seal surface and a radially outward facing seal surface. The manifold body, including the first and second annular passages, can be a single monolithic object. In some embodiments, the manifold body includes a first manifold portion and a second manifold portion. The first and second manifold portions can be joined together to form the first and second annular passages.

In accordance with another aspect, a system includes a combustor case defining a manifold receptacle bore therethrough, and a manifold including a manifold body seated in the manifold receptacle bore to plug seal pressure within the combustor case. A first annular passage is defined within the manifold body between a first passage inlet and a first passage outlet downstream from the first passage inlet. A second annular passage is defined within the manifold body nested radially outward from the first annular passage and between a second passage inlet and a second passage outlet downstream from the second passage inlet. The first and second annular passages are concentric about a manifold axis. The first passage outlet and the second passage outlet are positioned at the same axial position relative to the manifold axis. The system includes a fuel distributor in fluid communication with the first and second annular passages.

The manifold can include at least two additional annular passages in addition to the first annular passage and the second annular passage, and wherein both of the at least two additional annular passages are in fluid communication with at least a second fuel distributor for dual fuel, dual stage fuel injection. The manifold can include at least two additional pairs of annular passages in addition to the first annular passage and the second annular passage, and wherein each of the at least two pairs of additional annular passages is in fluid communication with at least one respective additional fuel distributor for at least three stage, dual fuel injection.

In accordance with some embodiments, the system includes an ignitor seated in a central passage of the manifold body for ignition of fuel issued from the fuel distributor. The system can include respective transfer tubes downstream from the first and second annular passages fluidically connecting each of the first and second passage outlets to the fuel distributor. The system can include a seal ring between the manifold body and the combustor case. The manifold body can define a seal groove on an outer surface of the manifold body. The seal ring can rest within the seal groove. The seal ring can abut a downstream facing seal surface on the combustor case, an upstream facing seal surface of the seal groove and a radially outward facing seal surface of the seal groove.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
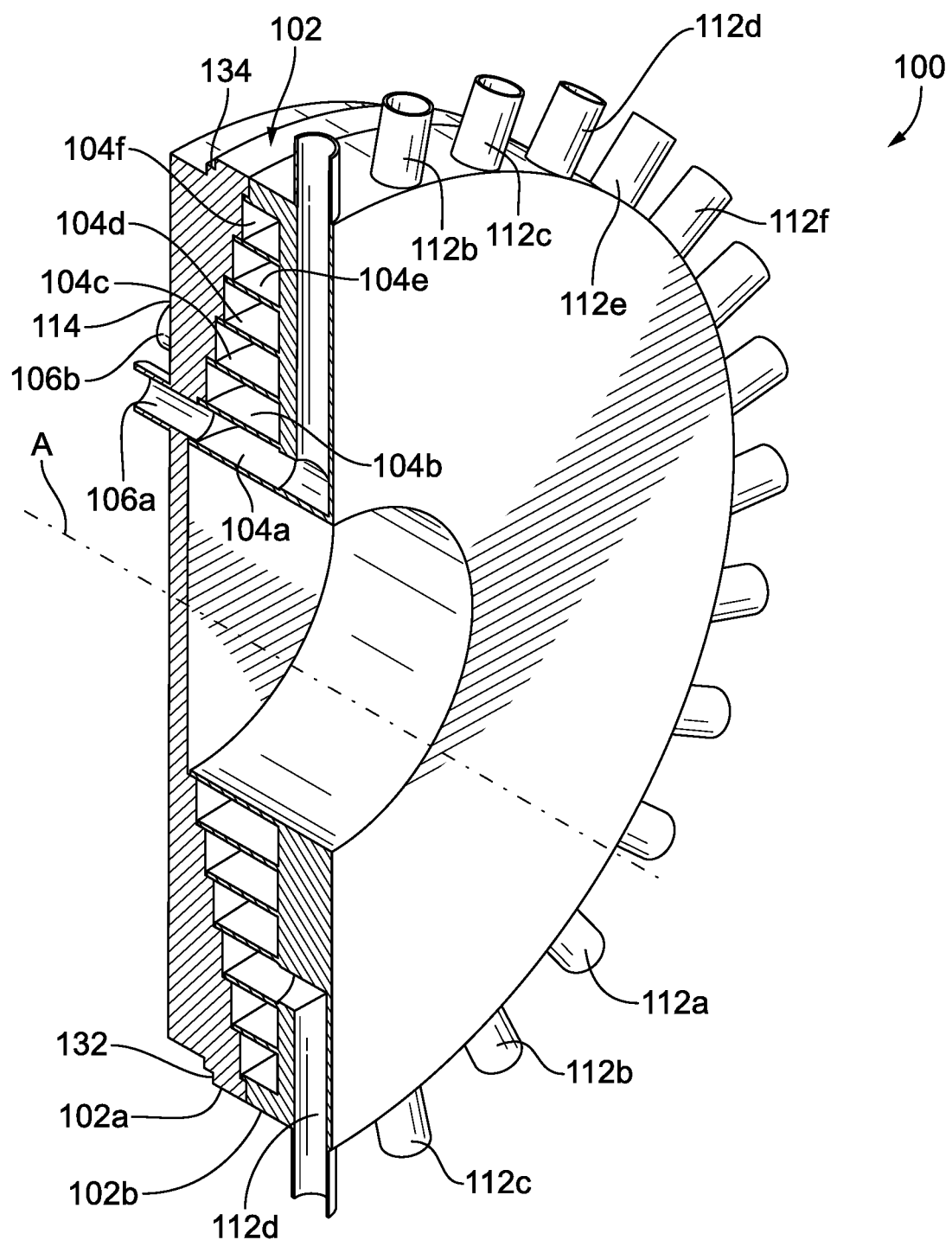
FIG. 1 is a schematic cross-sectional perspective view of an exemplary embodiment of a manifold constructed in accordance with the present disclosure, showing internal annular passages.

Reference will now be made to the drawings wherein like reference numerals identify similar structural features or aspects of the subject disclosure. For purposes of explanation and illustration, and not limitation, a partial view of an exemplary embodiment of a manifold in accordance with the disclosure is shown in FIG. 1 and is designated generally by reference character 100. Other embodiments of manifolds in accordance with the disclosure, or aspects thereof, are provided in FIGS. 2A-6, as will be described. The systems and methods described herein can be used to distribute and/or stage multiple fluids including liquids and gases, such as in dual stage, dual fuel injection for gas turbine engines.

As shown in FIG. 1, a fluid manifold 100 includes a manifold body 102 and a plurality of annular passages 104a-f defined within the manifold body 102. The annular passages 104a-104f are concentric about a manifold axis A. Annular passages 104b-104f after the inner most annular passage 104a are nested radially outward from one another. The manifold body 102 includes a first manifold portion 102a and a second manifold portion 102b. The first and second manifold portions 102a and 102b, respectively, form the annular passages 104a-f. The first and second manifold portions 102a and 102b, respectively, can be two separate pieces and can be brazed, welded or otherwise secured together. In some embodiments, the first and second manifold portions 102a and 102b, respectively, can be formed as a single monolithic object by casting or additively manufacturing the manifold body 102. Each of the passages 104a-104f are separated from one another with a respective cylindrical dividing portion 110a-110e, labeled in FIG. 3. The annular passages 104a-104f are fluidically isolated from one another by the cylindrical dividing portions 110a-110e. This allows different fluids, if desired, to be used in the respective annular passages 104a-104f. The separation between passages 104a-104f also permits independent control of each stage of each fuel. The nested and interwoven configuration allows the manifold 100 to be more compact compared to traditional manifolds.

Figure 2A:
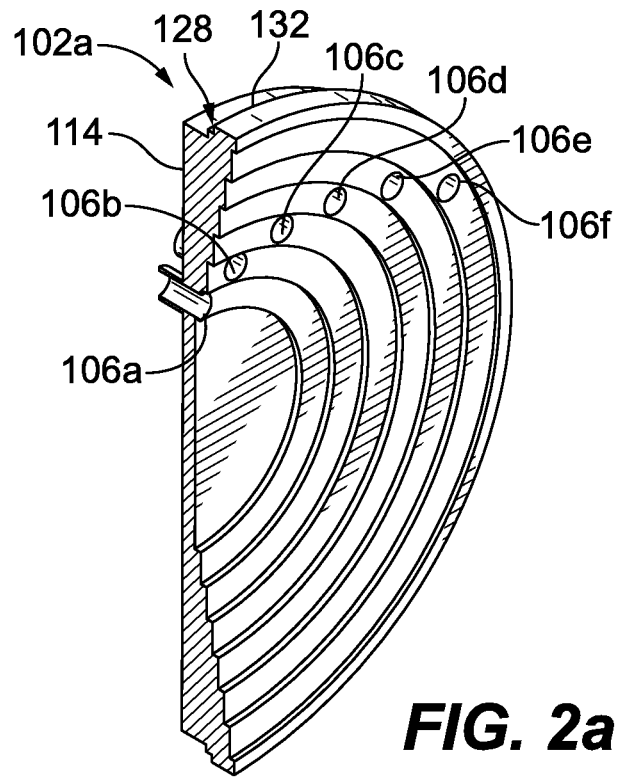
FIG. 2A is a schematic cross-sectional perspective view of a first portion of the manifold of FIG. 1, showing annular passage inlets.
Figure 2B:
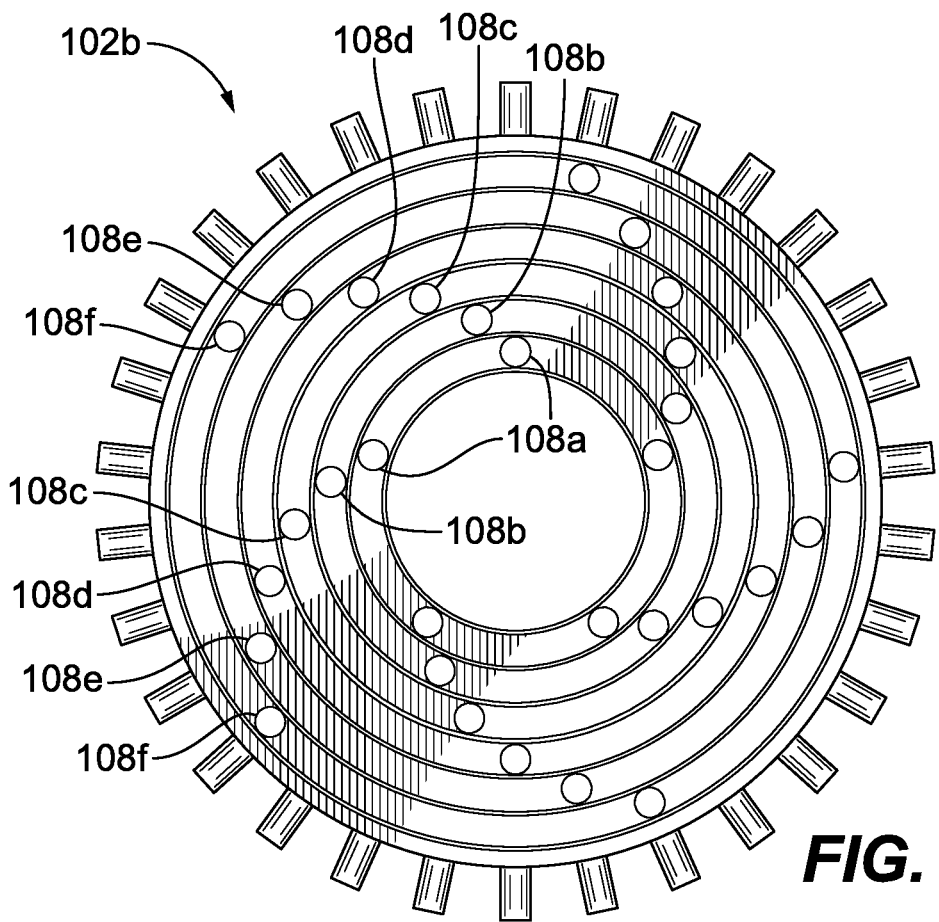
FIG. 2B is a schematic plan view of an upstream facing side of a second portion of the manifold of FIG. 1, showing annular passage outlets.

As shown in FIGS. 1, 2A and 2B, each annular passage 104a-104f includes a respective passage inlet 106a-106f and a plurality of respective passage outlets 108a-f downstream from their respective passage inlets 106a-106f. For example, the annular passage 104a as a single inlet 106a with multiple outlets 108a. The inlets 106a-106f of the annular passages 104a-104f are formed in an upstream axial facing surface 114 of the manifold body 102. The passage outlets 108a-f are all positioned at the same axial position relative to the manifold axis A. It is contemplated that some passage outlets can be positioned at different axial positions from one another. For example, the passage outlets 108a, 108c, and 108e can be associated with a gas fuel feed and can be at the same axial position, while passage outlets 108b, 108d and 108f can be associated with a liquid fuel feed and can be at the same axial position as one another, but a position different from that of outlets 108a, 108c and 108d. The passage outlets 108a-f are circumferentially offset from one another relative to the manifold axis A. It is also contemplated that some passage outlets can be positioned at the same circumferential positions relative to one another. For example, the passage outlets 108a and 108b can be associated with the first stage fuel distributor and can be at the same circumferential position, while passage outlets 108c and 108d can be associated with the second stage fuel distributor and can be at different circumferential position from passages 108a and 108b.

In the embodiment shown in FIGS. 2A and 2B, each annular passage 104a-104f includes five respective passage outlets 108a-f. For example, annular passage 104a includes five passage outlets 108a. While each annular passage is shown with five respective passage outlets, it is contemplated that in some embodiments more or less than five passage outlets can be used. Each annular passage 104a-104f is in fluid communication with a respective set of outlet channels 112a-f through its respective set of passage outlets 108a-f. The outlet channels 112a-f, branch off from their associated annular passage 104a-104f and extend in a radial direction relative to the manifold axis A.

Figure 3:
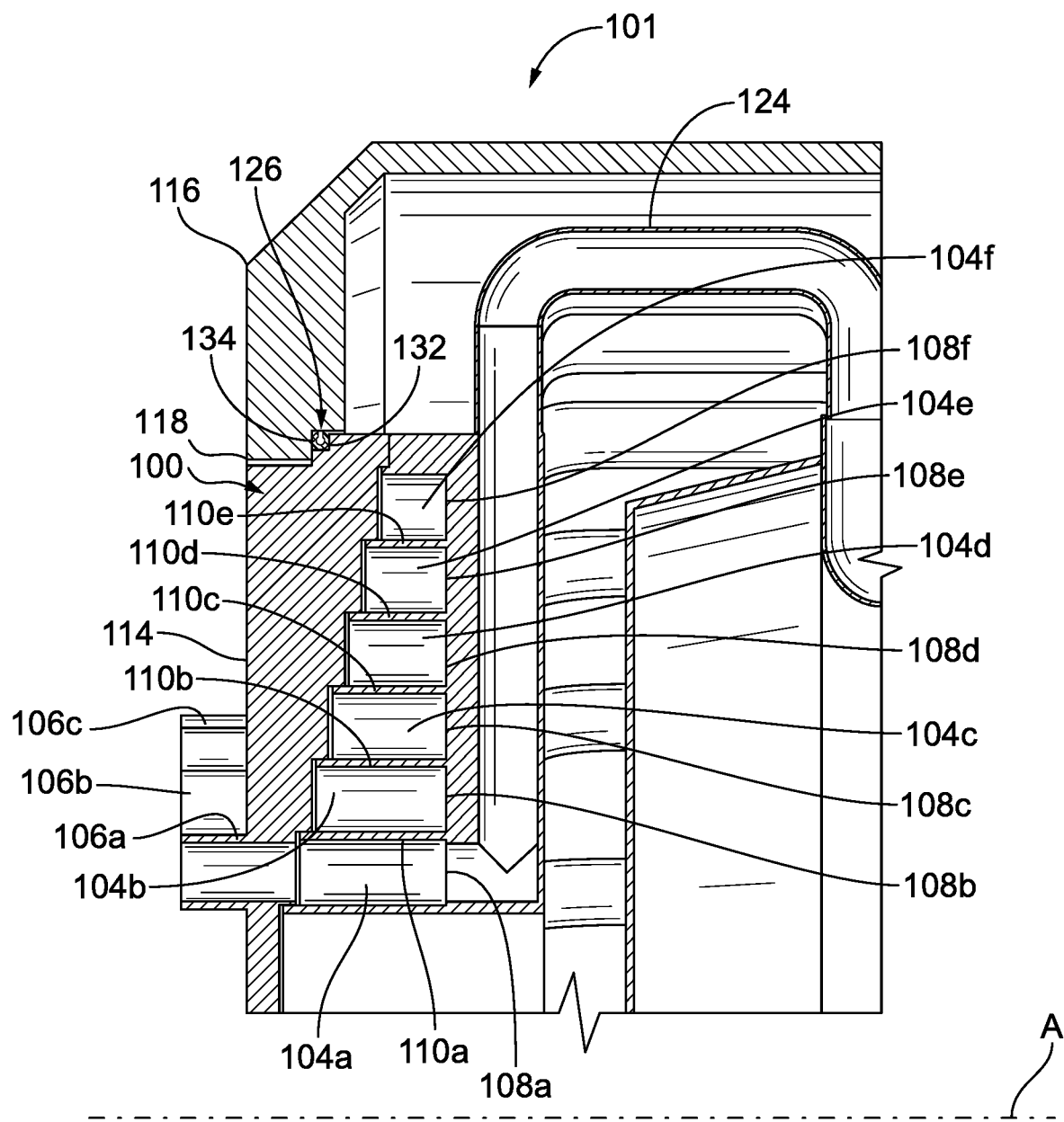
FIG. 3 is a schematic cross-sectional, side elevation view of a portion of the manifold of FIG. 1, showing the manifold in a combustor system.
Figure 4:
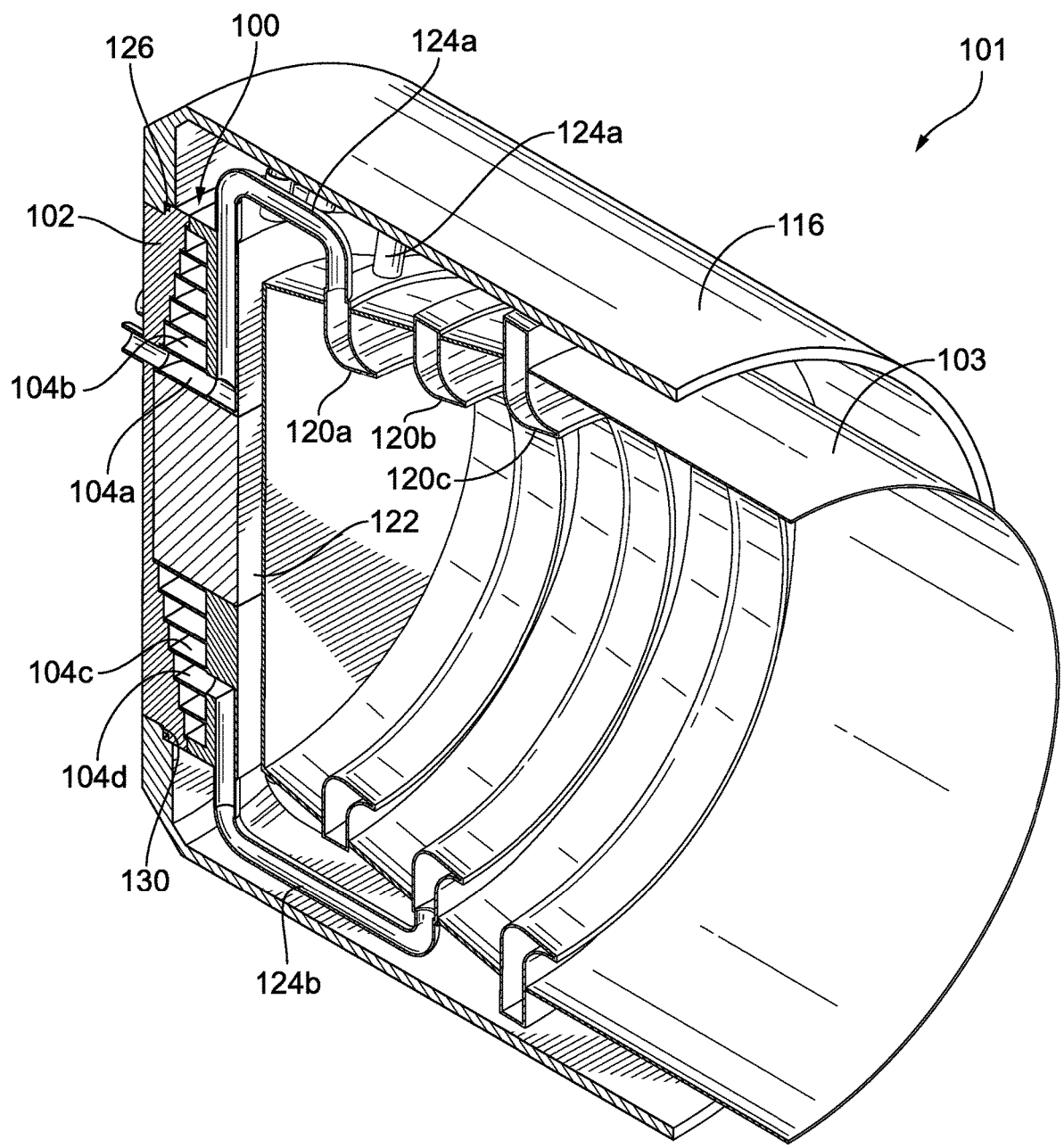
FIG. 4 is a schematic cross-sectional perspective view of an exemplary embodiment of a combustor system constructed in accordance with the present disclosure with the manifold of FIG. 1, showing the manifold body seated in the manifold receptacle bore.

As shown in FIGS. 3 and 4, the manifold 100 including manifold body 102 is in a combustor system 101. The system 101 includes a combustor case 116 defining a manifold receptacle bore 118 therethrough. The manifold body 102 is seated in the manifold receptacle bore 118 to plug seal pressure within the combustor case 116. The system 101 includes a plurality of fuel distributors 120a-c. Each fuel distributor 120a-c is in fluid communication with two of annular passages 104a-f to facilitate three stage, dual fuel injection. Fuel distributors 120a-c are in communication with the inside of a combustor 103. The system 101 includes an ignitor 122 seated in a central passage of the manifold body 102 for ignition of fuel issued from the fuel distributors 120a-120c. While the embodiments herein show manifolds that facilitate three stage, dual fuel injection, it is contemplated that some embodiments can also be used for single fuel-type injection, and/or injection with any number of stages, such as two-stage injection.

Figure 5:
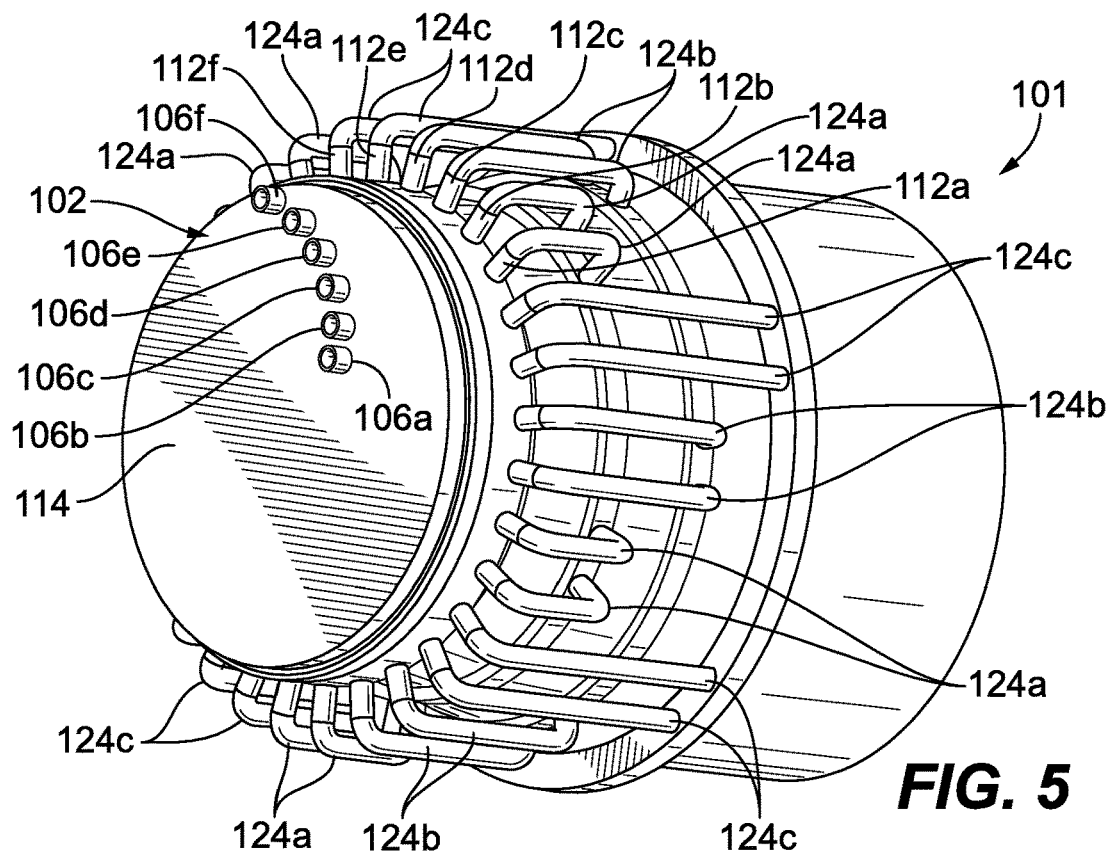
FIG. 5 is a schematic perspective view from the upstream side of an exemplary embodiment of a combustor system constructed in accordance with the present disclosure with the manifold of FIG. 1, showing the combustor case removed.
Figure 6:
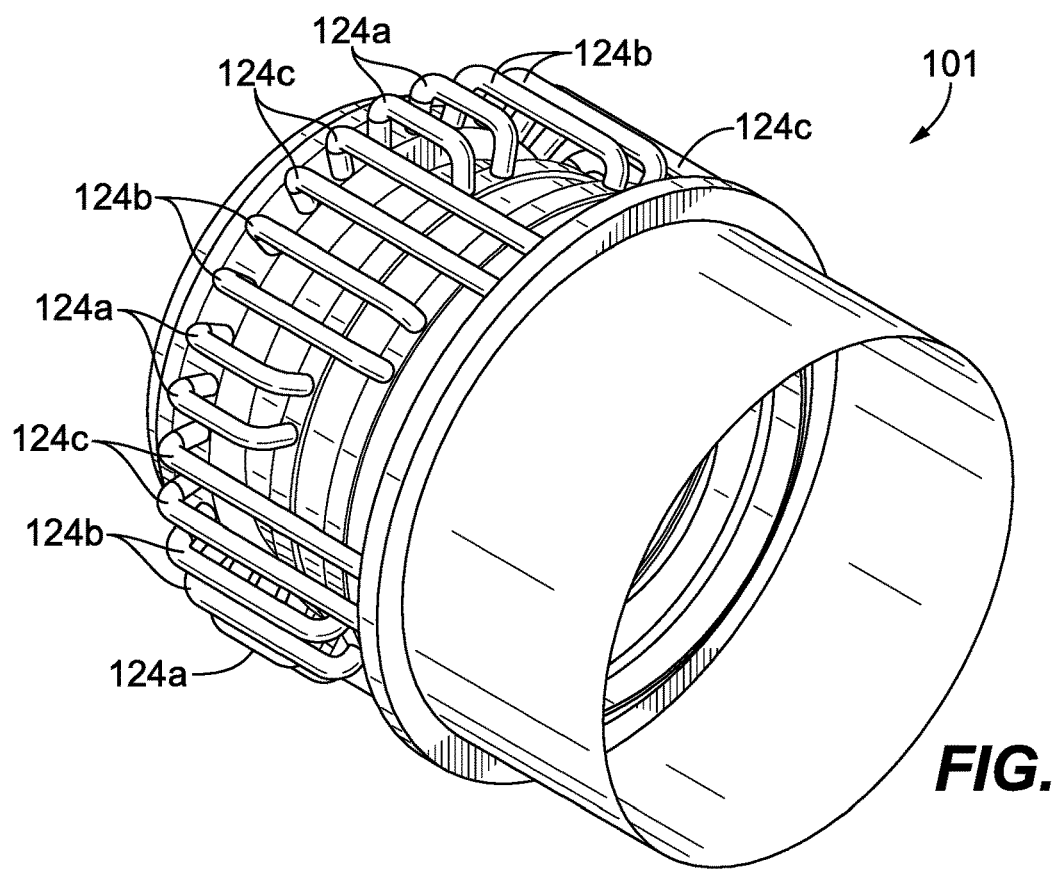
FIG. 6 is a schematic perspective view from the downstream side of an exemplary embodiment of a combustor system constructed in accordance with the present disclosure with the manifold of FIG. 1, showing the combustor case removed.

With reference now to FIGS. 4-6, the system 101 includes sets of transfer tubes 124a-c downstream from the annular passages 104a-f. Each passage outlet 108a-f and its associated outlet channel 112a-f is associated with a respective one of the transfer tubes 124a-124c to fluidly connect the passage outlets 108a (and in turn their associated annular passage 104a) to various stages of the fuel distributors 120a-c. In the embodiment depicted in the figures, there are 5 pairs of transfer tubes 124a-c for each stage. The number of transfer tubes can vary depending on the number of passage outlets 108 associated with a given annular passage 104. For example, annular passages 104a and 104b are in fluid communication with first stage fuel distributor 120a through the first stage transfer tubes 124a. Five of the transfer tubes 124a fluidly connect annular passage 104a with first stage fuel distributor 120a, via the outlets 108a and outlet channels 112a of annular passage 104a. The other five transfer tubes 124a fluidly connect annular passage 104b with first stage fuel distributor 120a via the outlets 108b and outlet channels 112b of annular passage 104b. This allows system 101 to provide gas fuel to fuel distributor 120a through annular passage 104a and/or liquid fuel to fuel distributor 120a through annular passage 104b.

With continued reference to FIGS. 4-6, annular passages 104c and 104d are in fluid communication with second stage fuel distributor 120b through transfer tubes 124b (10 total). Five of the transfer tubes 124b fluidly connect annular passage 104c with second stage fuel distributor 120b via the outlets 108c and outlet channels 112c of annular passage 104c. The other five transfer tubes 124b fluidly connect annular passage 104d with second stage fuel distributor 120b via the outlets 108d and outlet channels 112d of annular passage 104d. This allows system 101 to provide gas fuel to fuel distributor 120b through annular passage 104c and/or liquid fuel to fuel distributor 120b through annular passage 104d. Annular passages 104e and 104f are in fluid communication with third stage fuel distributor 120c through transfer tubes 124c. Five of the transfer tubes 124c fluidly connect annular passage 104e with third stage fuel distributor 120c via the outlets 108e and outlet channels 112e of annular passage 104e. The other five transfer tubes 124c fluidly connect annular passage 104f with third stage fuel distributor 120c via the outlets 108f and outlet channels 112f of annular passage 104f. This allows system 101 to provide gas fuel to fuel distributor 120c through annular passage 104e and/or liquid fuel to fuel distributor 120c through annular passage 104f. While it is described herein that each annular passage is associated with a given fuel distributor with five transfer tubes, it will be appreciated that in other embodiments the number of transfer tubes can vary depending on the number of outlets associated with a given annular passage.

With reference now to FIGS. 1, 2A, 3 and 4, the manifold body 102 defines a seal groove 128 on an outer surface of the manifold body 102. The seal groove 128 includes an upstream facing seal surface 132 and a radially outward facing seal surface 134. The system 101 includes seal ring 126 between the manifold body 102 and the combustor case 116 that rests in the seal groove 128. The seal ring 126 abuts a downstream facing seal surface 130 on the combustor case 116, an upstream facing seal surface 132 of the seal groove 128 and a radially outward facing seal surface 134 of the seal groove 128. The seal ring 126 can be a c-seal ring. In this embodiment, pressure from inside the combustor 103 pushes the manifold upstream, e.g. to the left as oriented in FIG. 4, which tightens the seal. This arrangement requires a smaller seal surface as compared with traditional assemblies where the nozzle portions of combustors are removable from the outside of the combustor case and therefore must withstand the force from the pressure within the combustor.

It is contemplated that manifolds 100 and combustor systems 101 as described herein can be retrofitted into existing gas turbine engines. Moreover, while shown and described herein in the exemplary context of fuel manifolds 100, those skilled in the art will readily appreciate that manifolds 100 as disclosed herein can be used in any suitable application where it is desired to maintain separate fluid circuits in a manifold, such as in food or chemical processing or the like.

Systems and methods as described herein allow for receiving fluids from multiple sources, and for delivering to multiple outlets for each source. It is contemplated that manifolds as described have multiple annular passages acting to divide fluid evenly among multiple individual circuits, e.g., for fuel injection. Manifolds as described herein can operate better at lower flow rates or power levels than traditional manifold arrangements. Manifolds as described herein can minimize manifold size for efficient packaging or advantageous envelope for multiple fluid circuits. Manifolds as described herein can fit within envelopes designed for traditional manifold arrangements, e.g., without taking up room outside a combustor case.

The methods and systems of the present disclosure, as described above and shown in the drawings, provide for manifolds with superior properties including compact form factor. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fluid manifold system comprising:
a manifold body;
  a first annular passage defined within the manifold body, the first annular passage having a first flow path between a first passage inlet and a first passage outlet downstream from the first passage inlet;
  a second annular passage defined within the manifold body nested radially outward from the first annular passage, the second annular passage having a second flow path between a second passage inlet and a second passage outlet downstream from the second passage inlet, wherein the first and second annular passages are concentric about a manifold axis, wherein the first passage outlet and the second passage outlet are positioned at the same axial position relative to the manifold axis
  a first radially extending outlet channel defined within the manifold body, wherein the first radially extending outlet channel is in fluid communication with the first annular passage via the first passage outlet;
  a second radially extending outlet channel defined within the manifold body, wherein the second radially extending outlet channel is in fluid communication with the second annular passage via the second passage outlet, wherein the first radially extending outlet channel and second radially extending outlet channel are positioned at the same axial position relative to the manifold axis; and
  a fuel distributor in fluid communication with the first and second annular passages via the first radially extending outlet channel and second radially extending outlet channel.

2. The fluid manifold system as recited in claim 1, wherein the first passage outlet and the second passage outlet are circumferentially offset from one another relative to the manifold axis.

3. The fluid manifold system as recited in claim 1, further comprising at least one additional annular passage defined within the manifold body, wherein a first one of the at least one additional annular passage is nested radially outward of the second annular passage.

4. The fluid manifold system as recited in claim 1, wherein the manifold body includes a cylindrical dividing portion, wherein the first annular passage and the second annular passage are fluidically isolated from another by the cylindrical dividing portion.

5. The fluid manifold system as recited in claim 1, wherein the first passage outlet is one of a plurality of distinct first passage outlets and wherein the first radially extending outlet channel is one of a plurality of distinct first radially extending outlet channels, wherein each of the first passage outlets is in fluid communication with one of the plurality of first radially extending outlet channels of the first annular passage.

6. The fluid manifold system as recited in claim 5, wherein each of the radially extending outlet channels extends in a radially outward direction perpendicular to the manifold axis.

7. The fluid manifold system as recited in claim 1, wherein the second passage outlet is one of a plurality of distinct second passage outlets and wherein the second radially extending outlet channel is one of a plurality of distinct second radially extending outlet channels, wherein each of the second passage outlets is in fluid communication with one of the plurality of second radially extending outlet channels of the second annular passage.

8. The fluid manifold system as recited in claim 7, wherein each of the radially extending outlet channels extends in a radially outward direction perpendicular to the manifold axis.

9. The fluid manifold system as recited in claim 1, wherein the inlets of the first and second annular passages are formed in an upstream axial facing surface of the manifold body.

10. The fluid manifold system as recited in claim 1, wherein the manifold body defines a seal groove on an outer surface of the manifold body.

11. The fluid manifold system as recited in claim 10, wherein the seal groove includes an upstream facing seal surface and a radially outward facing seal surface.

12. The fluid manifold system as recited in claim 1, wherein the manifold body, including the first and second annular passages, is a single monolithic object.

13. The fluid manifold system as recited in claim 1, wherein the manifold body includes a first manifold portion and a second manifold portion, wherein the first and second manifold portions are joined together to form the first and second annular passages.

14. A system comprising:
  a combustor case defining a manifold receptacle bore therethrough;
  a manifold including a manifold body seated in the manifold receptacle bore to plug seal pressure within the combustor case, wherein a first annular passage is defined within the manifold body, the first annular passage having a first flow path between a first passage inlet and a first passage outlet downstream from the first passage inlet, and wherein a second annular passage is defined within the manifold body nested radially outward from the first annular passage, the second annular passage having a second flow path between a second passage inlet and a second passage outlet downstream from the second passage inlet, wherein the first and second annular passages are concentric about a manifold axis, wherein the first passage outlet and the second passage outlet are positioned at the same axial position relative to the manifold axis; and
  a fuel distributor in fluid communication with the first and second annular passages, wherein each of the first and second annular passage outlets are in fluid communication with respective radially extending outlet channels defined within the manifold body, wherein each outlet channel is positioned at the same axial position relative to the manifold axis.

15. The system as recited in claim 14, wherein the manifold includes two additional annular passages in addition to the first annular passage and the second annular passage, and wherein both of the two additional annular passages are in fluid communication with a second fuel distributor for dual fuel, dual stage fuel injection.

16. The system as recited in claim 14, wherein the manifold includes two additional pairs of annular passages in addition to the first annular passage and the second annular passage, and wherein each of the two pairs of additional annular passages is in fluid communication with a respective additional fuel distributor for three stage, dual fuel injection.

17. The system as recited in claim 14, further comprising an ignitor seated in a central passage of the manifold body for ignition of fuel issued from the fuel distributor.

18. The system as recited in claim 14, further comprising respective transfer tubes downstream from the first and second annular passages fluidically connecting each of the first and second passage outlets to the fuel distributor.

19. The system as recited in claim 14, further comprising a seal ring between the manifold body and the combustor case, wherein the manifold body defines a seal groove on an outer surface of the manifold body, wherein the seal ring rests within the seal groove.

20. The system as recited in claim 19, wherein the seal ring abuts a downstream facing seal surface on the combustor case, an upstream facing seal surface of the seal groove and a radially outward facing seal surface of the seal groove.

* * * * *